US009538506B2

(12) United States Patent
Mukherjee (10) Patent No.: US 9,538,506 B2
(45) Date of Patent: Jan. 3, 2017

(54) METHOD TO TAKE MOBILE STATION PREFERENCE FOR CHANNEL TYPE INTO CONSIDERATION WHEN PERFORMING CODEC NEGOTIATION

(75) Inventor: Subrata Mukherjee, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 679 days.

(21) Appl. No.: 13/981,489

(22) PCT Filed: Jan. 27, 2011

(86) PCT No.: PCT/CN2011/070697
§ 371 (c)(1),
(2), (4) Date: Aug. 15, 2013

(87) PCT Pub. No.: WO2012/100422
PCT Pub. Date: Aug. 2, 2012

(65) Prior Publication Data
US 2014/0051455 A1    Feb. 20, 2014

(51) Int. Cl.
*H04W 72/00* (2009.01)
*H04W 72/04* (2009.01)
(Continued)

(52) U.S. Cl.
CPC ....... *H04W 72/0406* (2013.01); *H04W 88/181* (2013.01); *H04L 1/0014* (2013.01); *H04L 2001/0097* (2013.01); *H04W 76/02* (2013.01)

(58) Field of Classification Search
CPC .......... H04L 1/0014; H04L 2001/0097; H04W 72/0406; H04W 76/02; H04W 88/181
(Continued)

(56) References Cited

U.S. PATENT DOCUMENTS

2003/0195981 A1* 10/2003 Graf .................... H04W 88/181
709/238
2004/0095958 A1* 5/2004 Ejzak .................. H04W 88/181
370/465

(Continued)

FOREIGN PATENT DOCUMENTS

CN       1663306 A      8/2005
CN       101056452 A    10/2007
(Continued)

OTHER PUBLICATIONS

International Search Report and Written Opinion, PCT/CN2011/070697, Nov. 3, 2011.

(Continued)

Primary Examiner — Timothy Pham
(74) Attorney, Agent, or Firm — Myers Bigel, P.A.

(57) ABSTRACT

Controlling establishment of a connection between an originating subscriber connected via an originating radio network to a communication network and a terminating subscriber connected via a terminating radio network to the communication network. The connection is established between originating payload node and terminating payload node employing a common coding scheme. Coding scheme negotiation comprises establishing, in originating control node (OCN), a list of supported coding schemes of originating subscriber, originating radio network and originating payload node. Determining, by the OCN, a radio channel property of the originating subscriber, oRCP, relaying the list and the radio channel property between the control nodes controlling the connection towards a terminating control node (TCN). Removing, by the control nodes, non-supported coding schemes from the list. Determining, by the TCN, common coding scheme(s) for the connection by selecting a remaining coding scheme considering the oRCP (Continued)

and a radio channel property of the terminating subscriber, tRCP.

20 Claims, 5 Drawing Sheets (51) Int. Cl.
*H04W 88/18* (2009.01)
*H04L 1/00* (2006.01)
*H04W 76/02* (2009.01)

(58) Field of Classification Search
USPC .................................................. 455/452.1
See application file for complete search history.

(56) References Cited

U.S. PATENT DOCUMENTS

| 2007/0019620 | A1* | 1/2007 | Surana ............... H04W 88/181 370/352 |
| 2007/0171841 | A1 | 7/2007 | Witzel et al. |
| 2008/0146208 | A1 | 6/2008 | Ejzak et al. |
| 2009/0047936 | A1* | 2/2009 | Kampmann .......... H04W 28/18 455/414.1 |
| 2010/0161325 | A1* | 6/2010 | Hellwig ................ H04L 5/1438 704/229 |

FOREIGN PATENT DOCUMENTS

| KR | 20100003085 A | 1/2010 |
| WO | WO 03/092312 A1 | 11/2003 |
| WO | WO 2009075617 A1 | 6/2009 |

OTHER PUBLICATIONS

International Preliminary Report on Patentability, PCT/CN2011/070697, Jul. 30, 2013.
3GPP TS 23.153 V11.1.0 (Jun. 2012) "Out of band transcoder control" Stage 2, (Release 11); 3rd Generation Partnership Project; Technical Specification Group Core Network and Terminals; 650 Route des Lucioles—Sophia Antipolis, Valbonne—France; 103 pages.
Nokia Siemens Networks et al., "AoIP—MAP level codec negotiation for GSM codecs", Change Request—C4-103378, 3GPP TSG CT4 Meeting #51, Jacksonville, U.S., Nov. 15-19, 2010.

* cited by examiner

METHOD TO TAKE MOBILE STATION PREFERENCE FOR CHANNEL TYPE INTO CONSIDERATION WHEN PERFORMING CODEC NEGOTIATION

CROSS REFERENCE TO RELATED APPLICATION

This application is a 35 U.S.C. §371 national stage application of PCT International Application No. PCT/CN2011/070697, filed on 27 Jan. 2011, the disclosure and content of which is incorporated by reference herein in its entirety. The above-referenced PCT International Application was published in the English language as International Publication No. WO 2012/100422 A1 on 2 Aug. 2012.

TECHNICAL FIELD

The invention relates to a method and nodes for controlling a connection in a communication network and in particular for controlling on a call-by-call basis a selection of coding schemes along a wireless or wireline connection.

BACKGROUND

In telecommunications networks such as GSM (Group System for Mobile Communication) and UMTS (Universal Mobile Telecommunication System) and UTRAN (Universal Telecommunication Radio Access Network), in which WCDMA (Wideband Code Division Multiple Access) is one radio transmission method, the transferred data, e. g. speech data, is compressed before it is transported over the radio interface. This reduces the bandwidth demands on the scarce resource radio interface. To achieve this compression, codecs (coder and decoder algorithms as well as a means provided for performing that algorithm) are used. The term codec can be replaced by the term "coding scheme" which has the same meaning. In many networks different codecs can be used and different nodes can have different capabilities for handling codecs. When conversion from one coding scheme to another takes place, the process is called transcoding. Transcoding anywhere in the speech path negatively affects data quality. The number of transcoding stages in the speech path has to be minimized in order to maximize data quality. In the following data quality in the meaning of this application is the quality of audio or video data.

Determination of an optimal codec may be done by means of Codec Negotiation. 3GPP standard TS 23.153 specifies an Out of Band Transcoder Control (OoBTC) procedure which is the capability of a network to negotiate the types of codec and codec modes on a call per call basis with out-of-band signalling procedures. These procedures are specified to take place in the call setup phase or possibly later if there is a need to re-negotiate the codec. OoBTC is performed between serving core network nodes or control nodes taking into account transcoding capabilities of all involved parties, including the user equipment (UE), the radio network nodes and the Media Gateway (MGW) nodes under the control of their serving or control nodes. Ideally the same codec is used in the whole connection between the access networks. This well known codec negotiation mechanism is only based on the capability of involved parties.

Figure 1:
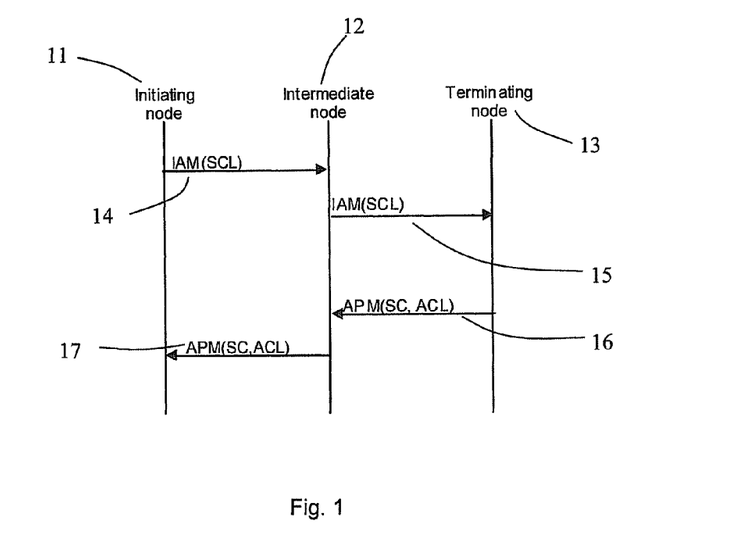
FIG. 1 shows a block diagram of an embodiment of a well known codec negotiation procedure in a core network.

FIG. 1 shows a simplified dataflow diagram which depicts the message flow in a negotiation procedure of coding schemes or codecs between control nodes of a telecommunication network. An initiating node 11 initiating codec negotiation creates a codec list containing a list of all codecs supported by a payload node which is under control of the initiating node. The so called supported codec list (SCL) is forwarded in a Bearer Independent Call Control (BICC) Initial Address Message (IAM) 14 to the terminating control node 13. Any intermediate control node 12 evaluates the SCL and removes non-supported codecs from the SCL. An intermediate node 12 can not add new codecs which e.g. are supported in addition by the intermediate node 12. The SCL is further forwarded 15 to the terminating control node 13. The terminating control node 13, which terminates the codec negotiation, evaluates the SCL, removes non-supported codecs from the SCL and selects the most appropriate codec for the call from the remaining codecs in the SCL. The selected codec (SC) and the available codec list (ACL) which is a copy of the final SCL after the terminating control node 13 has removed non-supported codecs from the SCL are sent backwards via a BICC application transport mechanism (APM) message 16 and 17 to the initiating control node 11. The initiating node 11, the intermediate node 12 and the terminating node 13 setup their payload nodes to use the selected codec which was indicated in the APM BICC message 16, 17.

Figure 2:
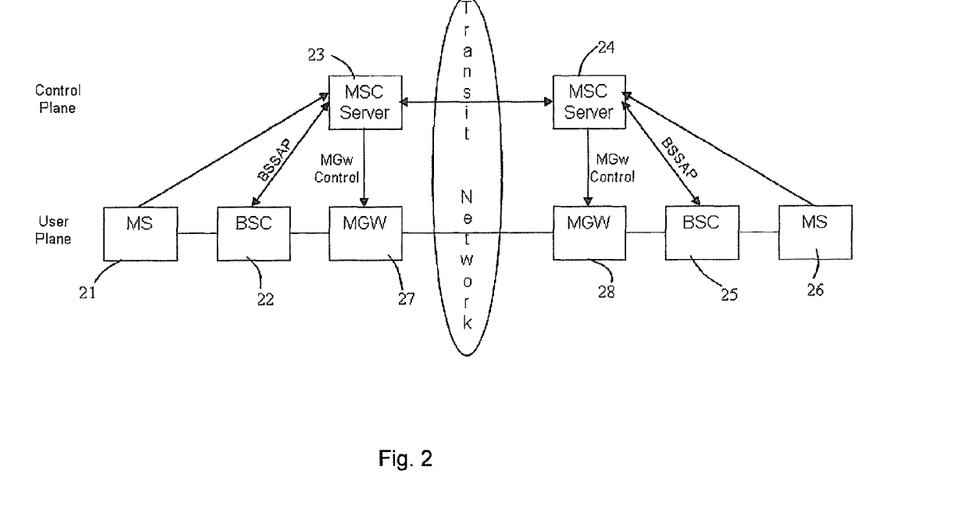
FIG. 2 shows a block diagram of an embodiment of a communication network according to the state of the art.

FIG. 2 shows a circuit switched communication network comprising MSC Server 23, 24 as control nodes. Every MSC Server 23, 24 is in control of a payload node or media gateway node MGW 27, 28. Further an originating mobile equipment or subscriber MS 21 is connected via a base station controller BSC 22 to the MGW 27 and is further connected to the MSC Server 23. A terminating MS 26 is connected via the terminating BSC 25 to the terminating MGW 28 and to the terminating MSC Server 24. Between the originating side and the terminating side of the network a transit network is located which may comprise further control nodes and/or payload nodes. The payload is routed over the MGWs 27, 28 between the mobile terminals or equipments 21, 26 in the User Plane. The control data is routed over the MSC Server 23, 24 in the Control Plane. The codec negotiation takes place between the MSs 21, 26 and the MSC Server 23, 24. The MSC Server 23, 24 are in control of their MGW 27, 28 via MGW Control messages and of the BSC 22, 25 via BSSAP messages. After codec negotiation has been established the MSC Server 23, 24 will instruct the MGWs 27, 28 and the BSCs 22, 25 to use at least one specific codec.

Figure 3:
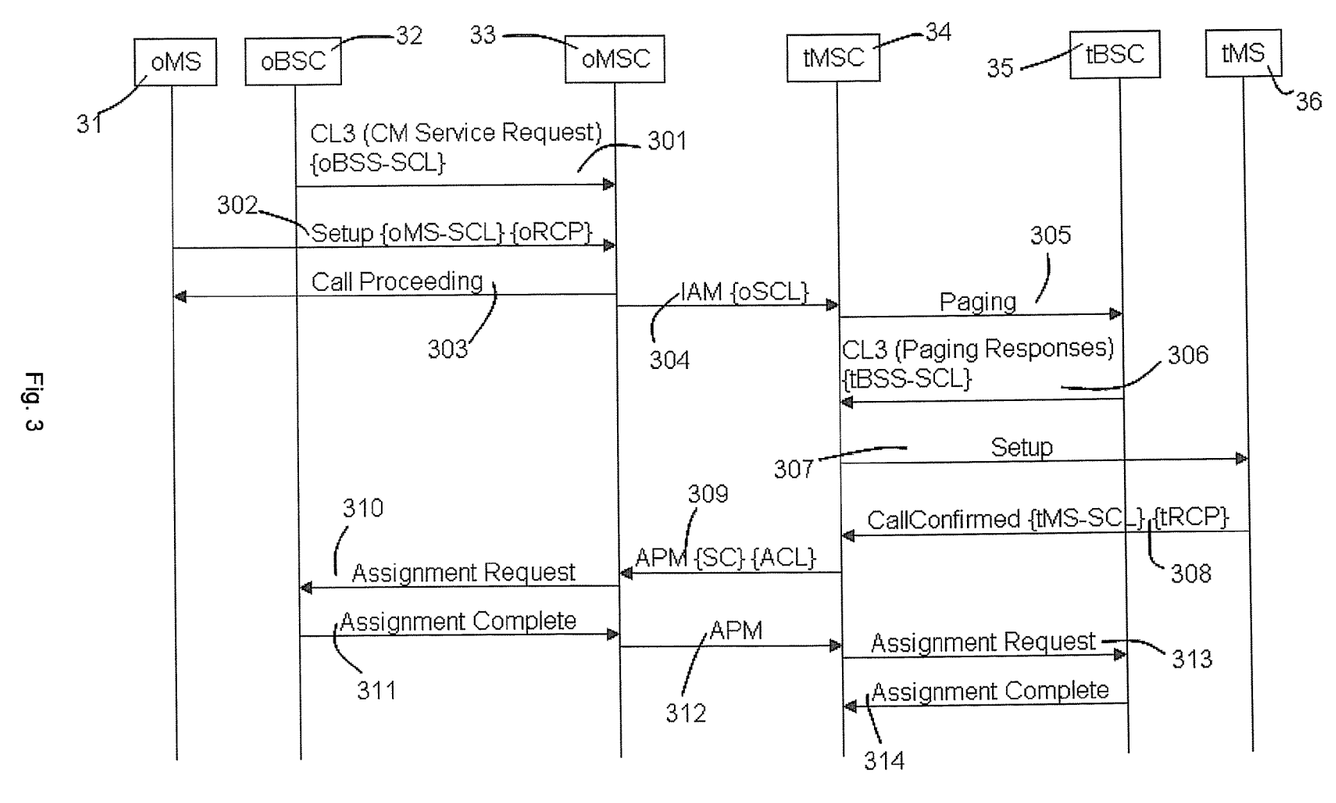
FIG. 3 shows an exemplary sequence diagram of an embodiment of a well known codec negotiation procedure in a communication network.

A more complex dataflow diagram of a state-of-the-art codec negotiation is shown in FIG. 3. At a call setup in an AoIP-scenario (interface user plane over IP), the originating call control node 33, which is depicted as an originating mobile switching center (oMSC) but which can be any kind of control node controlling a connection in a telecommunication network, receives 301 a list of codecs which are supported by an originating radio network control node 32. In case of an interface over TDM scenario the oMSC 33 configures the codec for the oBSC 32. This radio network control node 32 is pictured as a base station controller node of a GSM network but can be any kind of radio network control node. This supported codec list of the originating base station subsystem (oBSS-SCL) is sent to the oMSC 33 via a Complete Layer 3 (CL3) message 301. The CM Service Request message is contained within the Complete Layer 3 (CL3) message. The originating call control node 33 further receives via a setup message 302 a list of supported codecs of the originating mobile subscriber 31 (oMS-SCL). An example for GSM codecs are:
GSM_HR;
GSM_FR;
GSM_EFR;

HR-AMR(set 1);
FR-AMR(set 1);
FR-AMR-WB(set 0).

FR-AMR-WB(set 0), FR-AMR(set 1), GSM_EFR and GSM_FR are full rate codecs. The codecs HR-AMR(set 1) and GSM_HR are half rate codecs. Half rate codec requires half the bandwidth of the full rate codec. Usage of half rate codecs allows the operator to handle more calls since they use less bandwidth. At the same time, usage of half rate codecs results in lower speech quality. Normally the codecs will be prioritized, to be included in an originating supported codec list (oSCL), in the order FR-AMR-WB(set 0), FR-AMR(set 1), GSM_EFR, HR_AMR(set 1), GSM_FR and GSM_HR. This order is determined on operator preference for codecs to be used for speech calls and based on the speech quality to be achieved using the codecs in transcoder free situations.

The setup message 302 further comprises a radio channel property (oRCP) as preferred by the originating subscriber 31. The oRCP indicates the type of radio channels selected and is used by the oMSC 33 to select the codec for the originating radio call leg between the oMS 31 and the oMSC 33. At first assignment the selection of the traffic channel to be used by the oBSC 32 is based on the preference of the mobile subscriber 31, the preference for each basic service or operator and the capacity of the oBSC 32. The oRCP is received from the oMS 31 and possibly modified by the Telecommunication Service Analysis in order to take operator's preference for channel rate and type into consideration. For speech calls, RCP can include following values as example:

Half Rate (HR) channel required;
Full Rate (FR) channel required;
HR or FR channel required, HR channel preferred;
HR or FR channel required, FR channel preferred;
HR or FR channel required, no preference.

After the oMSC 33 sends a Call Proceeding message 303 to the oMS 31, an IAM message 304 is sent to the terminating control node tMSC 34. This message comprises an originating supported codec list (oSCL), which was built in the oMSC 33 by using the oMS-SCL, the oBSS-SCL and the capacity of the controlled, but not shown originating media gateway node (oMGW) which is under control of the oMSC 33. FIG. 3 does not disclose any intermediate node due to illustration reason. If there are intermediate nodes between the oMSC 33 and the tMSC 34, these nodes will remove any non-supported codecs, which are not supported by the intermediate payload nodes under control of the intermediate control nodes from the oSCL and forward the oSCL to the next intermediate control node or to the terminating control node tMSC 34.

After the tMSC 34 receives the oSCL in the IAM 304 it removes all codecs which are not supported in the terminating MGW. After a paging procedure 305 took place, executed by the tMSC 34 to find the allocated terminating mobile subscriber (tMS) 36, a CL3 message 306 containing paging response is sent from the terminating base station controller tBSC 35, which is in control of the tMS 36, to the tMSC 34. This message 306 comprises a supported codec list of the terminating Base Station Subsystem (tBSS). After the tMSC 34 sends a Setup message 307 to the tMS 36, the tMS 36 sends a Call Confirmed message 308 including a supported codec list (tMS-SCL) and the radio channel property of the terminating mobile station (tRCP) to the tMSC 34. The tRCP is used by the tMSC 34 to select the codec for the terminating radio call leg.

The tMSC 34 creates a terminating SCL taking into consideration the tMS-SCL, tBSS-SCL and the tMSC-SCL. The terminating MSC 34 then selects a selected codec (SC) which is best suited for this call. The SC is selected based on the oSCL that has been received and from which all non-supported codecs are removed. Possibly the tMSC-SCL is also considered when establishing the SC. From the perspective of the tMSC 34 the SC is the best codec suited for the call as a compromise between speech quality and bandwidth usage. The SC is supported by all MGWs which are involved in this call (for transporting the payload information of the call in the core network) such that the best call quality and/or bandwidth usage is reached. Further the tMSC 34 creates an available codec list (ACL) which comprises all codecs of the oSCL after the tMSC 34 removed the non-supported codecs from this list.

The ACL is the list of all codecs which are supported in the payload nodes (MGWs) of the core network. This list contains all codecs which are supported in all nodes involved in the codec negotiation for the call. The ACL and the SC are sent in an APM (Application transport message) 309 to the oMSC 33. All possible intermediate control nodes and the originating control node 33, which receive the APM 309 comprising the ACL and the SC, will setup their controlled media gateways to establish the SC for this specific call to use the codec specified by the SC.

After the oMSC 33 received the APM 309, an Assignment Request message 310 is sent to the oBSC 32 containing a list of codecs in preferred order by taking into consideration SC as well as oRCP. The oBSC 32 answers with an Assignment Complete message 311 containing the codec that is used for the call on the originating radio access. After the oMSC 33 receives the Assignment Complete message 311, it sends an APM message to the terminating MSC 34 which also sends an Assignment Request message 313 to the tBSC 35. The Assignment Request message 313 contains a list of codecs in preferred order by taking into consideration the SC as well as the tRCP. The tBSC 35 sends back an Assignment Complete message 314 to the tMSC 314 containing the codec list that is used for the call on the terminating radio access. After the tMSC 314 receives the Assignment Complete message the negotiation process is completed.

If the originating or the terminating radio call leg has to use a codec, based on the oRCP and the tRCP, which might be different to the selected codec SC of the core network, a codec transcoding has to be performed in the originating and/or the terminating control node. This can result in a lower speech quality as well as increasing resource usage because every transcoding procedure reduces the data quality and requires higher processing need.

As an example for a codec negotiation according to the state of art it is assumed that the oMS 31 supports the codecs {GSM_HR, GSM_FR, GSM_EFR}. It is further assumed that the oRCP of the mobile subscriber which is allocated to the oMS 31 indicates that it supports both halfrate radio channel (HR) and fullrate radio channel (FR), but prefers HR. Further the oBSC 32 supports {GSM_EFR, GSM_FR, GSM_HR} and the core network supports {GSM_EFR, GSM_FR, GSM_HR, PCM}. The originating MSC 33 will generates an oSCL as {GSM_EFR, GSM_FR, GSM_HR, PCM} and will send it in a BICC IAM message 304 to the terminating control node tMSC 34. It is assumed that the tMS 36 supports codecs {GSM_HR, GSM_FR, GSM_EFR} and the tRCP indicates that it supports both HR and FR channels, but prefers HR. Further the tBSS-SCL should looks like {GSM_HR, GSM_FR, GSM_EFR} and the core network on the terminating side supports {GSM_EFR, GSM_FR, GSM_HR, PCM}. The tMSC 34 chooses the codec GSM_EFR as the selected codec (SC) which will be used by the media gateways in the core network. This codec will be sent as the selected codec (SC) to the oMSC 33. If an intermediate node is arranged between the oMSC 33 and the tMSC 34, it will setup the intermediate MGW to use the selected codec GSM_EFR.

Due to the fact that the RCP on both sides prefers HR, the communication leg between the originating MGW and the originating MS 31 will be defined as GSM_HR. The same occurs on the terminating side. As a result, a transcoding between the codec GSM_EFR and the codec GSM_HR will take place in both the originating MGW and the terminating MGW. This results in unnecessary usage of valuable transcoder resources and a reduction of data quality.

SUMMARY

The object of the invention is to provide optimal data quality and/or to minimize the bandwidth needs in the telecommunications core network. This object is achieved by the independent claims. Advantageous embodiments are described in the dependent claims.

In accordance with one aspect of the invention the foregoing and other objects are achieved in a method for controlling the establishment of a connection between an originating subscriber, connected via an originating radio network to a communication network and a terminating subscriber, connected via a terminating radio network to the communication network. The communication network comprises control nodes through which control signals are routed and payload nodes through which payload data is routed, wherein the connection is to be established between an originating payload node and a terminating payload node that are adapted to employ a common coding scheme. The negotiation of the coding scheme comprises the steps of establishing, in an originating control node, a list of supported coding schemes from supported coding schemes of the originating subscriber, the originating radio network and the originating payload node, determining, by the originating control node, a radio channel property of the originating subscriber, oRCP, relaying the list of supported coding schemes and the radio channel property between the control nodes controlling the connection towards a terminating control node and removing, by the control nodes, non-supported coding schemes from the list of supported coding schemes, and determining, by the terminating control node, at least one common coding scheme for the connection by selecting one of the remaining coding schemes from the list of supported coding schemes considering the oRCP and a radio channel property of the terminating subscriber, tRCP. The control nodes which are removing non-supported coding schemes or codecs from the list of supported coding schemes are intermediate control nodes which are in control of intermediate media gateway nodes which are part of the call path between the originating subscriber and the terminating subscriber. The consideration of the oRCP and the tRCP means that the selection of the common codec scheme is at least dependent on the values of the tRCP and the oRCP. This allows the network controller to select a codec which also take into account the required or preferred channel rates, which can be e.g. "full rate" or "half rate".

In a further embodiment the determination of a common coding scheme by the terminating control node comprises the steps of determining from the result of a comparison of the oRCP and the tRCP a common radio channel property and determining the common coding scheme for the communication from the list of supported coding depending on the common radio channel property. The comparison means that the terminating control node comprises a database which comprises all possible combinations of tRCP's and oRCP's. By comparing the tRCP and the oRCP, the terminating control node can fetch the relevant common channel rate for the determination step of the common coding scheme for the call. The determination of the common coding scheme is now based on the preferred or required common channel rate. If a coding scheme is a half rate coding scheme like GSM_HR and the common RCP is half rate, this coding scheme is a candidate for the common coding scheme or common codec.

In a further embodiment the common coding scheme is the coding scheme from the list of supported coding scheme which channel rate is in accordance with the common radio channel property and which meets at least one further criterion. The list of supported coding schemes mostly comprises more than one coding scheme which can be selected based on the common RCP. To find the relevant coding scheme a further criterion can be used. In a further embodiment the further criterion is the speech quality of the connection or the bandwidth usage of the common coding scheme. A network operator can select the criterion which should be used to find the common coding scheme. If the network is in an overload condition one criterion for selecting the common coding scheme can be a low bandwidth usage. Another network with enough bandwidth can use the speech quality as a criterion for selecting the common codec. If e.g. the common RCP is a required full rate channel and the list of supported codecs or coding schemes comprises two full rate codecs wherein one full rate codec uses a better compression algorithm to keep a higher speech quality than the other codec in the list, the terminating control node will select the full rate codec with the higher speech quality in case the operator wants to provide a network with high quality.

In a further embodiment the common coding scheme is in accordance with the non-preferred channel rate if the common radio channel property is a preferred channel rate and if no coding scheme in the list of supported coding scheme is in accordance with the preferred channel rate. If the preferred channel rate is not found in the list of supported codecs, the terminating control node will select a codec from the list which does not fulfill the RCP requirement but e.g. fulfill the requirements of a further criterion.

In a further embodiment the common coding scheme is in accordance with all channel rates if both the oRCP and the tRCP comprise no preferred radio channel property. This can happen if non of the subscriber provides a radio channel property. In a further embodiment the common coding scheme is in accordance with the tRCP if only the oRCP comprises no preferred radio channel property or if the oRCP is equal to the tRCP. In a further embodiment the common coding scheme is in accordance with the oRCP only the tRCP indicates no preferred radio channel property, or if the oRCP indicates a required half rate channel or full rate channel, or if the tRCP indicates a required half rate or full rate channel, or if the tRCP indicates a required half rate channel and the oRCP indicates a preferred half rate channel; or if the tRCP indicates a required full rate channel and the oRCP indicates a preferred full rate channel, or if the oRCP is equal to the tRCP. In a further embodiment the common coding scheme is in accordance with a preferred half rate channel, if the tRCP indicates a required half rate channel and the oRCP indicates a preferred full rate channel. In a further embodiment the common coding scheme is in accordance with a preferred full rate channel, if the tRCP indicates a required full rate channel and the oRCP indicates a preferred half rate channel.

In a further embodiment the list of supported coding schemes is relayed by a Bearer Independent Call Control Initial Address Message, BICC IAM.

In a further embodiment the radio channel property of the originating subscriber is contained in the BICC-IAM as an additional parameter.

In a further embodiment the radio channel property of the originating subscriber is contained in the list of supported coding schemes as a specific coding scheme. Therefore no changes in the already existing messages have to be done.

In a further embodiment the communication network is a circuit switched network. Further the communication network can be a GSM network.

The invention relates also to a terminating control node of a communication network for controlling the establishment of a connection between an originating subscriber connected via an originating radio network to the communication network and a terminating subscriber connected via a terminating radio network to the communication network. The connection is to be established between an originating payload node and a terminating payload node through which payload data is routed and that are adapted to employ a common coding scheme. Further the terminating control node controls the terminating payload node, comprising a receiving unit, adapted to receive a list of supported coding schemes which was established by an originating control node, controlling the originating payload node, and a radio channel property of the originating subscriber. The terminating control node comprises further a first processing unit, adapted to remove coding schemes from the list of supported coding schemes which are not supported by the terminating payload node and a second processing unit, adapted to determining at least one common coding scheme for the connection by selecting one of the remaining coding schemes from the list of supported coding schemes considering the radio channel property of the originating subscriber and a radio channel property of the terminating subscriber. The terminating control node comprises further a sending unit, adapted to send the common coding scheme towards the originating control node.

In further embodiments the terminating control node is adapted to perform all the steps of the method of at least one of the prescribed embodiments of the invention.

The invention relates also to an originating control node of a communication network for controlling the establishment of a connection between an originating subscriber connected via an originating radio network to the communication network and a terminating subscriber connected via a terminating radio network to the communication network. The connection is to be established between an originating payload node and a terminating payload node through which payload data is routed and that are adapted to employ a common coding scheme. The originating control node controls the originating payload node, and comprises a receiving unit, adapted to receive supported coding schemes of the originating subscriber, of the originating radio network and of the originating payload node and adapted to receive a radio channel property from the originating subscriber. Further the originating control node comprises a processing unit, adapted to establish a list of supported coding schemes from supported coding schemes of the originating subscriber, the originating radio network and the originating payload node and a sending unit, adapted to send the list of supported coding schemes and the radio channel property towards a terminating control node which controls the terminating payload node.

In further embodiments the originating control node is adapted to perform all the steps of the method of at least one of the prescribed embodiments of the invention.

The present invention also concerns computer programs comprising portions of software codes in order to implement the method as described above when operated by a respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 4:
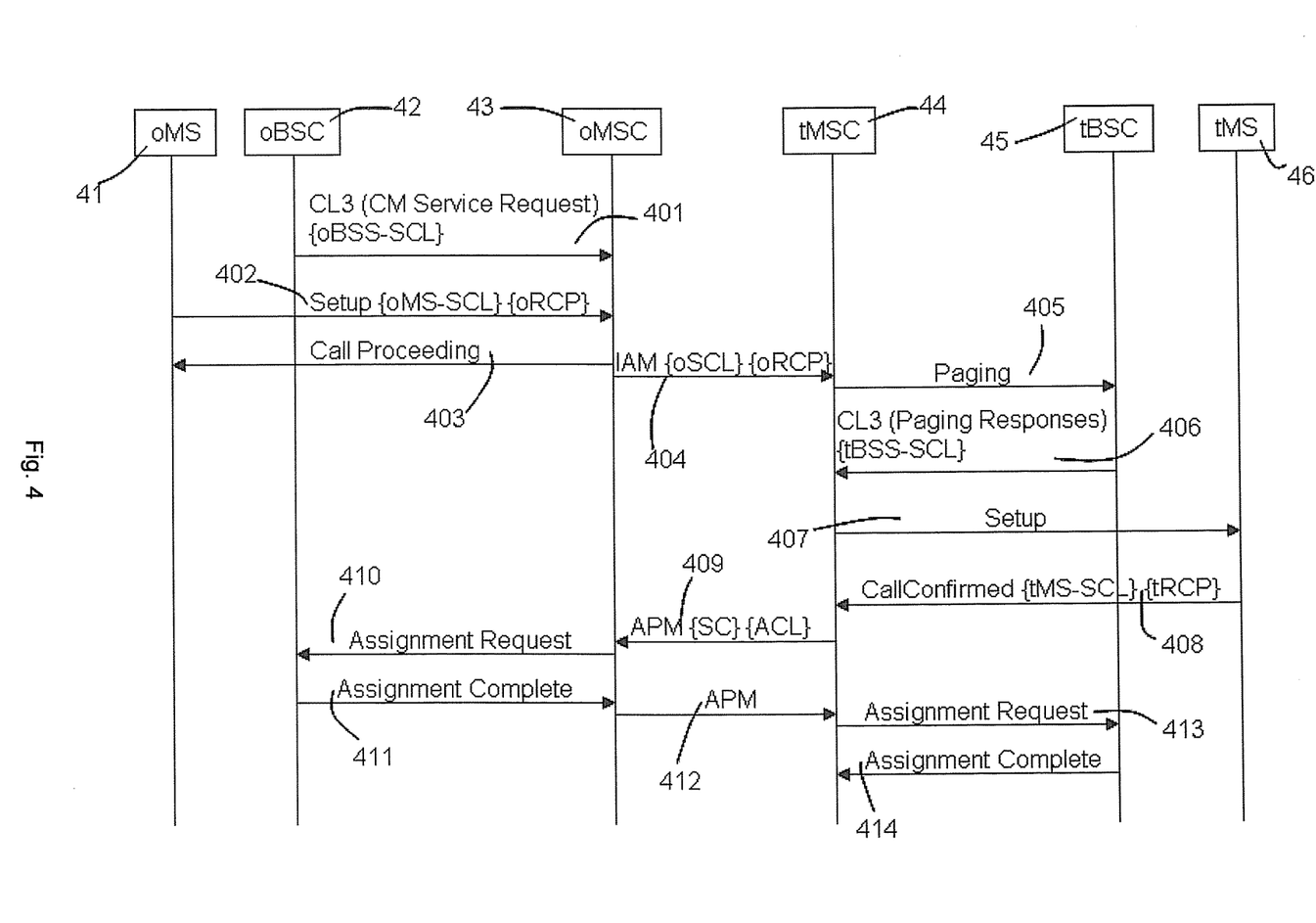
FIG. 4 shows an exemplary sequence diagram of a first embodiment of a codec negotiation procedure in accordance with the invention.

FIG. 4 shows a sequence comprising an originating mobile subscriber (oMS) 41 which is connected via an originating base station controller (oBSC) 42 at an originating control node 43, which is depicted as an originating mobile switching center (oMSC). Further a terminating mobile subscriber (tMS) 46 is connected via a terminating base station controller (tBSC) 45 at a terminating control node 44, which is depicted as an terminating mobile switching center (tMSC). The first three steps 401, 402 and 403 are comparable to the steps of FIG. 3 wherein the oBSC 42 sends a Complete Layer 3 (CL3) message 401 containing CM Service Request to the oMSC 43 comprising the list of supported codecs of the originated base station subsystem oBSS-SCL. In a next step 402 the oMSC 43 receives a Setup message from the oMS 41 comprising the originating mobile subscriber supported codec list oMS-SCL and the radio channel property oRCP of the originating subscriber oMS 41. After sending a Call Proceeding message 403 to the oMS 41 the oMSC 43 establishes a list of supported codecs oSCL considering the radio channel property of the originator oRCP. This is done by checking the oRCP which channel rate is preferred or required. Based on this information, the order of the list of supported codecs will be arranged so that the codecs which are in accordance with the preferred or required channel of the oRCP will be listed on top of this list. The higher the rank of the codec in the oSCL is, the more relevant this codec is for this call, i.e. the more likely it is to result in best speech quality and/or bandwidth usage.

The originating supported codec list oSCL and the radio channel property of the originating node oRCP are relayed in an IAM message 404 between the control nodes controlling the connection towards a terminating control node tMSC 44. Any intermediate control node (not shown in FIG. 4) removes codecs which are not supported by the payload nodes which are under control of the intermediate nodes. The oRCP is relayed unchanged towards the terminating control node tMSC 44.

The tMSC 44 removes from the oSCL any codec which is not supported by the controlled terminating payload node. After a Paging message 405 is sent from the tMSC 44 to the tBSC 45, the tMSC 44 receives a CL3 message containing a Paging Response message 406 from the tBSC 45 comprising the supported codecs from the terminating base station subsystem tBSS-SCL. As a result of a Setup message 407 which was sent from the tMSC 44 to the tMS 46, the tMS 46 sends a Call confirmation message 408 comprising the supported codec list of the terminating subscriber tMS-SCL and the terminating radio channel property tRCP. The tMSC 44 establishes a further codec list which comprises the supported codecs of the terminating base station subsystem tBSS-SCL, the supported codecs of the terminating payload node and the codec list of the terminating subscriber tMS-SCL. The tMSC 44 also takes into account the radio channel property of the terminating node tRCP like it was done in the oMSC 43.

The tMSC 44 now compares its further codec list with the received oSCL to create a codec list which comprises only codecs which are common to both lists. This codec list is the codec list from which the selected codec (SC) will be chosen. To find the SC for the call, the tMSC 44 uses the received oRCP and the tRCP as depicted in the following table:

TABLE 1

| oRCP | tRCP | | | | |
|---|---|---|---|---|---|
| | FR required | HR required | Dual, FR preferred | Dual, HR preferred | Dual, No Preference |
| FR required | FR required | FR required | FR required | FR required | FR required |
| HR required | HR required | HR required | HR required | HR required | HR required |
| Dual, FR preferred | FR preferred | HR preferred | FR preferred | FR preferred | FR preferred |
| Dual, HR preferred | FR preferred | HR preferred | HR preferred | HR preferred | HR preferred |
| Dual, no preference | FR required | HR required | FR preferred | HR preferred | Same choice |

Figure 7:
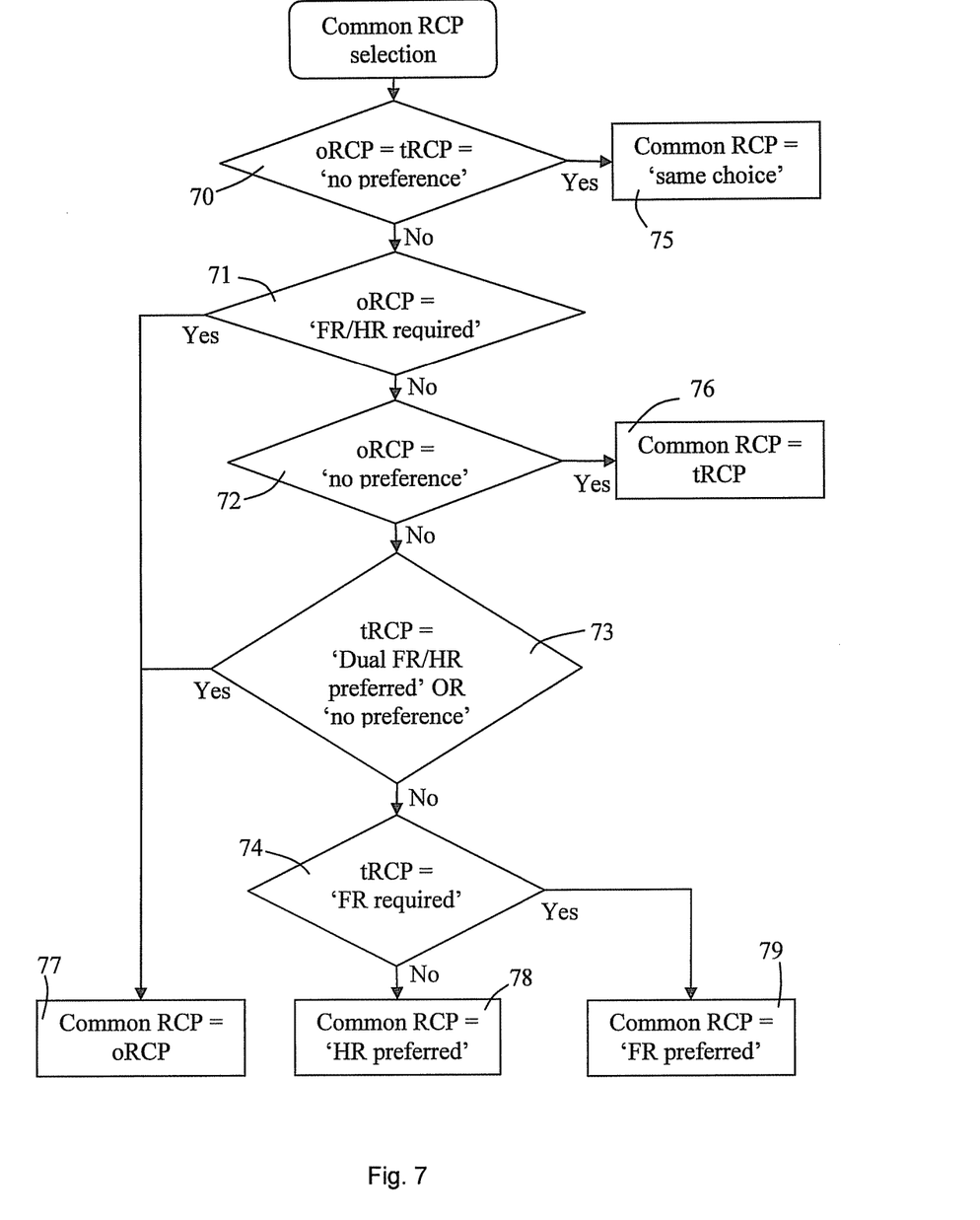
FIG. 7 shows a flow chart of an embodiment of the decision process for the common RCP according to the invention.

The selection of the SC will be based on the result of the table. FIG. 7 shows a flow chart of an embodiment of the decision process for finding the common RCP from the available oRCP and tRCP. These steps can be performed by a computer program which may be stored on a removable storage. The computer program can be executed in a processor of the tMSC 44. If a result is given in one of the output steps 75, 76, 77, 78, 79 the routine will be stopped and the result will be forwarded to the next routine which is described afterwards in the next paragraph. If the content of one of the parameters (tRCP, oRCP or common RCP) is "no preference" it does have the same meaning as "Dual, no preference".

In case the tRCP is equal to the oRCP and no preference is given in the first step 70, the common RCP is set to "same choice" in output step 75. Otherwise, the program checks in a next step 71 if the oRCP is "FR required" or "HR required". If the result is "Yes", the common RCP will be the oRCP in the output step 77. Otherwise a further check is performed in the next step 72 if the oRCP is "no preference". If the result of this check 72 is "Yes", the common RCP will be the tRCP in the output step 76. If the result of this step 72 is "No", a next step 73 is performed in which it checked if the tRCP-value is "Dual, FR preferred" or "Dual HR preferred" or "Dual no preference". In case this check 73 is positive (Yes), the common RCP will be the oRCP in output step 77. If the result is negative (No), it is checked in a further step 74 if the tRCP is "FR required". If the tRCP is "FR required", the common RCP will be "FR preferred" in output step 79. Otherwise, the tRCP is "HR required" which will lead to a common RCP "HR preferred" in the output step 78.

Now it is described how the results of the output steps 75 to 79 will influence the selection of the SC from the list of supported codecs. If the result from Table 1 and FIG. 7 of comparing oRCP and tRCP is "Same Choice" then the first codec from the list of common codecs is chosen as SC by the tMSC 44. If the result from Table 1 of comparing oRCP and tRCP is "FR required", then the first full rate codec from the list of common codecs is chosen as SC by the tMSC 44. If the result from Table 1 of comparing oRCP and tRCP is "HR required", then the first half rate codec from the list of common codecs is chosen as SC by the tMSC 44. If the result from Table 1 of comparing oRCP and tRCP is "FR preferred", then if a full rate codec is included in the list of common codecs then the first full rate codec from the list of common codecs is chosen as SC by tMSC 44; otherwise if no full rate codec is included in the list of common codecs then the first half rate codec from the list of common codecs is chosen as SC by the tMSC 44. If the result from Table 1 of comparing oRCP and tRCP is "HR preferred", then if a half rate codec is included in the list of common codecs, the first half rate codec from the list of common codecs is chosen as SC by tMSC 44. Otherwise if no half rate codec is included in the list of common codecs then the first full rate codec from the list of common codecs is chosen as SC by tMSC 44.

The tMSC 44 then sends back an APM message 409 comprising the ACL which is the oSCL after the tMSC 44 removes non-supported codecs from it, and the selected codec SC to the oMSC. The further messages 410 to 414 comprise the same functionality as in the embodiment of FIG. 3.

As an example for a codec negotiation according to the invention it is assumed that oMS 41 supports the codecs {GSM_HR, GSM_FR, GSM_EFR}. It is further assumed that the oRCP of the mobile subscriber which is allocated to the oMS 41 indicates that it supports both HR and FR channels, but prefers HR. Further the oBSC 32 supports {GSM_EFR, GSM_FR, GSM_HR} and the core network supports {GSM_EFR, GSM_FR, GSM_HR, PCM}. The originating MSC 43 will generates an oSCL by considering also the oRCP as {GSM_HR, GSM_EFR, GSM_FR, PCM} and will send it in a BICC IAM message 404 to the terminating control node tMSC 44. On the terminating side of the communication network it is assumed that the tMS 46 supports codecs {GSM_HR, GSM_FR, GSM_EFR} and the tRCP indicates that it supports both HR and FR channels, but prefers HR. It is further assumed that the tBSS-SCL looks like {GSM_HR, GSM_FR, GSM_EFR} and the core network on the terminating side supports {GSM_EFR, GSM_FR, GSM_HR, PCM}. The tMSC 44 will create a common list and additionally considers the oRCP and the tRCP. This results, based on Table 1, in a SC being chosen as GSM_HR. In this case no transcoding will be required in the speech path.

In another example the above described example is changed such that the tRCP indicates that the terminating subscriber prefers full rate (FR) codecs. The other parameters remain unchanged. The tMSC 44 will now select, based on Table 1, the codec GSM_HR as the SC. In this case, a transcoding on the terminating side has to be performed because the tMS 46 prefers FR.

In another example, the oRCP indicates that the originating subscriber supports both HR and FR channels, but prefers FR. The tRCP indicates that the terminating subscriber supports both HR and FR channels, but prefers HR. The oSCL sent by the oMSC 43 in IAM will be {GSM_EFR, GSM_FR, GSM_HR, PCM}. The other parameters remain unchanged in accordance with the first example. Based on the Table 1 the tMSC 44 selects codec GSM_EFR as the SC (selected codec). A transcoding on the terminating payload node will be needed because the terminating subscriber preferred half rate (HR) codecs.

It is possible that the oRCP is inserted as a dummy codec into the oSCL to prevent a change in the BICC IAM message. The "oRCP-codec" which is not a codec in the common way, can be named e.g. as {oRCP_HRreq} or the like to indicate that this codec in the oSCL is not a real codec but the oRCP from the originating subscriber 41.

If none of the originating or terminating nodes 43, 44 has implemented the mechanism of considering the RCPs in the codec negotiation, the normal procedure according the state of the art can be performed. If terminating side of the communication network does not provide radio channel property of its subscriber (e.g., it is not associated with 2G radio access), the terminating control node can handle the missing tRCP information as depicted in table 1, column 5. The missing tRCP can be treated as "Dual Rate, no preference" so that the available RCP of the originating subscriber 41 will specify the final choice of the preferred or required channel rate.

If originating side of the communication network does not provide radio channel property of its subscriber (for example, it is not associated with 2G radio access), the terminating control node can handle the missing oRCP information as depicted in Table 1, row 5. The missing oRCP can be treated as "Dual Rate, no preference" so that the available RCP of the terminating subscriber 46 will specify the final choice of the preferred or required channel rate.

Figure 5:
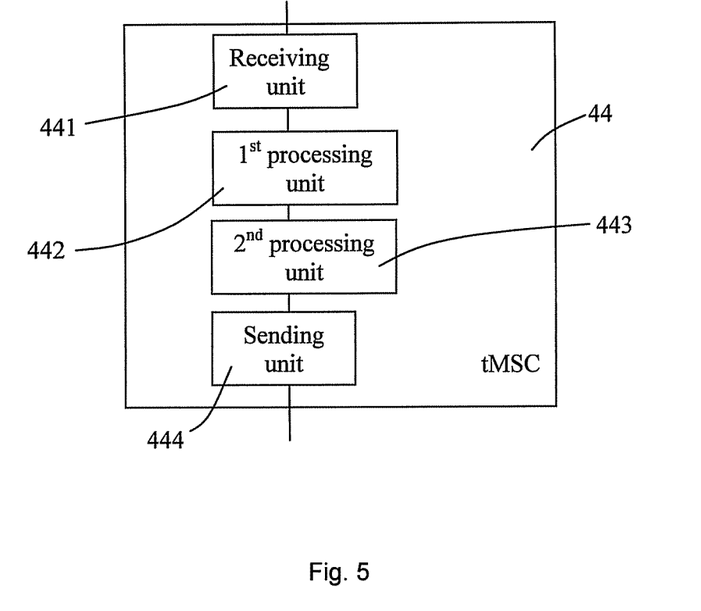
FIG. 5 shows a block diagram of an embodiment of a terminating control node according to the invention.

FIG. 5 shows an exemplary example of an inventive terminating control node 44 comprising a receiving unit 441 which is adapted to receive a list of supported coding schemes and a radio channel property of the originating subscriber 41. The receiving unit can comprises further sub-units which are all adapted to receive messages from other network-components. The terminating control node further comprises a first processing unit 442, adapted to remove coding schemes from the list of supported coding schemes which are not supported by the terminating payload node. Further the terminating control node comprises a second processing unit 443, adapted to determining at least one common coding scheme for the connection by selecting one of the remaining coding schemes from the list of supported coding schemes considering the radio channel property of the originating subscriber and the radio channel property of the terminating subscriber. The first and the second processing unit can be combined in one processing unit which comprises sub-units. Further the terminating control node comprises a sending unit 444, adapted to send the common coding scheme and the available codec list towards the originating control node 43.

Figure 6:
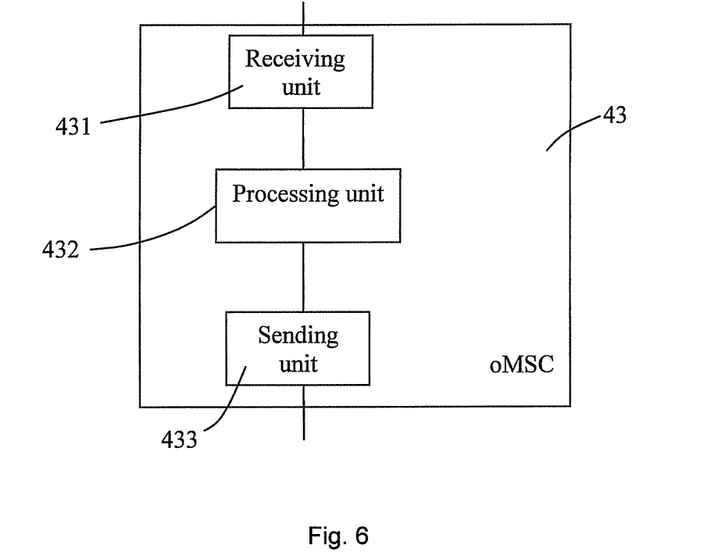
FIG. 6 shows a block diagram of an embodiment of an originating control node according to the invention.

FIG. 6 shows an exemplary example of an inventive originating control node 43 of a communication network comprising a receiving unit 431, adapted to receive supported coding schemes of the originating subscriber 41 and of the originating radio network. Further the receiving unit 431 is adapted to receive a radio channel property from the originating subscriber 41. The originating control node 43 comprises further a processing unit 432, adapted to establish a list of supported coding schemes from supported coding schemes of the originating subscriber 41, the originating radio network and the originating payload node. The originating control node 43 comprises further a sending unit 433, adapted to send the list of supported coding schemes and the radio channel property towards the terminating control node 44 which controls the terminating payload node.

The invention claimed is:

1. A method for controlling the establishment of a connection between an originating subscriber connected via an originating radio network to a communication network and a terminating subscriber connected via a terminating radio network to the communication network, the method comprising:
    establishing, in an originating control node, a list of supported coding schemes from supported coding schemes of the originating subscriber, supported coding schemes of the originating radio network and supported coding schemes of an originating payload node,
    determining, by the originating control node, a radio channel property of the originating subscriber, oRCP, that indicates a channel rate that is preferred or required by the originating subscriber,
    relaying, by one or more intermediate control nodes, the list of supported coding schemes and the oRCP a terminating control node and removing, by the one or more intermediate control nodes, non-supported coding schemes from the list of supported coding schemes to provide a list of remaining supported coding schemes, and
    determining, by the terminating control node, a common coding scheme for the connection by selecting one of the coding schemes from the list of remaining supported coding schemes based on the radio channel property of the originating subscriber, oRCP and based on a radio channel property of the terminating subscriber, tRCP, that indicates a channel rate that is preferred or required by the terminating subscriber,
    wherein the communication network comprises control nodes through which control signals are routed and payload nodes through which payload data is routed,
    wherein the connection is to be established between the originating payload node and a terminating payload node, and
    wherein the originating payload node and the terminating payload node are adapted to employ the common coding scheme.

2. The method of claim 1, wherein the determination of a common coding scheme by the terminating control node comprises the following steps:

determining from the result of a comparison of the oRCP and the tRCP a common radio channel property;

selecting the common coding scheme for the communication from the list of remaining supported coding schemes depending on the common radio channel property.

3. The method of claim 2, wherein the common coding scheme is determined as a coding scheme from the list of remaining supported coding schemes with a channel rate that is in accordance with the common radio channel property and that meets at least one further criterion.

4. The method of claim 3, wherein the further criterion is a speech quality of the connection or a bandwidth usage of the common coding scheme.

5. The method of claim 3, wherein each coding scheme of the list of remaining supported coding schemes is in accordance with the common radio channel property when both the oRCP and the tRCP comprise no preferred channel rate.

6. The method of claim 3, wherein the common coding scheme is in accordance with the tRCP when only the oRCP comprises no preferred radio channel property or when a preferred or required channel rate of the oRCP is equal to a preferred or required channel rate of the tRCP.

7. The method of claim 3, wherein the common coding scheme is in accordance with the oRCP when one of the following occurs:
only the tRCP indicates no preferred radio channel property, or
the oRCP indicates a required half rate channel or full rate channel, or
the tRCP indicates a required half rate channel and the oRCP indicates a preferred half rate channel; or
the tRCP indicates a required full rate channel and the oRCP indicates a preferred full rate channel, or
the oRCP is equal to the tRCP.

8. The method of claim 3, wherein the common coding scheme is in accordance with a half rate channel, when the tRCP indicates a required half rate channel and the oRCP indicates a preferred full rate channel.

9. The method of claim 3, wherein the common coding scheme is in accordance with a full rate channel, when the tRCP indicates a required full rate channel and the oRCP indicates a preferred half rate channel.

10. The method of claim 2, wherein when the common radio channel property is a preferred channel rate and when no coding scheme in the list of remaining supported coding schemes is in accordance with the preferred channel rate, the common coding scheme is determined in accordance with a non-preferred channel rate.

11. The method of claim 1, wherein the list of supported coding schemes is relayed by a Bearer Independent Call Control Initial Address Message, BICC IAM.

12. The method of claim 1, wherein the oRCP is contained in the BICC-IAM as an additional parameter.

13. The method of claim 1, wherein the oRCP is contained in the list of supported coding schemes as a specific coding scheme.

14. The method of claim 1, wherein the communication network is a circuit switched network.

15. The method of claim 14, wherein the communication network is a GSM network.

16. The method of claim 1, wherein each of the oRCP and tRCP indicates a required half rate channel, a preferred half rate channel, a preferred full rate channel, or a required full rate channel.

17. A terminating control node of a communication network for controlling the establishment of a connection between an originating subscriber connected via an originating radio network to the communication network and a terminating subscriber connected via a terminating radio network to the communication network, the terminating control node comprising:
a receiving unit that is adapted to receive a list of supported coding schemes that was established by an originating control node that controls an originating payload node, and a radio channel property of the originating subscriber, oRCP, that indicates a channel rate that is preferred or required by the originating subscriber;
a first processing unit that is adapted to remove coding schemes from the list of supported coding schemes that are not supported by a terminating payload node to provide a list of remaining supported coding schemes;
a second processing unit, adapted to determine at least one common coding scheme for the connection by selecting one of the coding schemes from the list of remaining supported coding schemes based on the radio channel property of the originating subscriber, oRCP, and based on a radio channel property of the terminating subscriber, tRCP, that indicates a channel rate that is preferred or required by the terminating subscriber; and
a sending unit that is adapted to send the at least one common coding scheme towards the originating control node,
wherein the connection is to be established between the originating payload node and the terminating payload node through which payload data is routed,
wherein the originating payload node and the terminating payload node are adapted to employ the at least one common coding scheme, and
wherein the terminating control node controls the terminating payload node.

18. The terminating control node of claim 17, wherein each of the oRCP and tRCP indicates a required half rate channel, a preferred half rate channel, a preferred full rate channel, or a required full rate channel.

19. An originating control node of a communication network for controlling the establishment of a connection between an originating subscriber connected via an originating radio network to the communication network and a terminating subscriber connected via a terminating radio network to the communication network, the originating control node comprising:
a receiving unit that is adapted to receive supported coding schemes of the originating subscriber, supported coding schemes of the originating radio network, and supported coding schemes of an originating payload node and adapted to receive a radio channel property from the originating subscriber, oRCP, that indicates a channel rate that is preferred or required by the originating subscriber;
a processing unit that is adapted to establish a list of supported coding schemes from the supported coding schemes of the originating subscriber, the supported coding schemes of the originating radio network, and the supported coding schemes of the originating payload node, and
a sending unit, adapted to send the list of supported coding schemes and the oRCP towards a terminating control node that controls a terminating payload node,
wherein the connection is to be established between the originating payload node and the terminating payload node through which payload data is routed, wherein the originating payload node and the terminating payload node are adapted to employ a common coding scheme, and wherein the originating control node controls the originating payload node.

20. The originating control node of claim 19, wherein the oRCP indicates a required half rate channel, a preferred half rate channel, a preferred full rate channel, or a required full rate channel.

* * * * *